(12) United States Patent
Nemoto et al.

(10) Patent No.: US 6,497,595 B2
(45) Date of Patent: Dec. 24, 2002

(54) OUTBOARD ENGINE UNIT

(75) Inventors: Hideki Nemoto, Wako (JP); Shoichi Rinzaki, Wako (JP)

(73) Assignee: Honda Giken Kogyo Kabushiki Kaisha (JP)

( * ) Notice: Subject to any disclaimer, the term of this patent is extended or adjusted under 35 U.S.C. 154(b) by 0 days.

(21) Appl. No.: 09/938,368

(22) Filed: Aug. 24, 2001

(65) Prior Publication Data

US 2002/0025739 A1 Feb. 28, 2002

(30) Foreign Application Priority Data

Aug. 25, 2000 (JP) .................................. 2000-255224
Feb. 7, 2001 (JP) .................................. 2001-031240

(51) Int. Cl.[7] ............................................. B63H 20/32
(52) U.S. Cl. ......................................................... 440/77
(58) Field of Search ...................................... 440/77, 78

(56) References Cited

U.S. PATENT DOCUMENTS

| 4,734,070 A | * | 3/1988 | Mondek | 123/195 P |
| 5,424,494 A | * | 6/1995 | Houle et al. | 181/229 |
| 5,445,547 A |   | 8/1995 | Furukawa | 440/77 |
| 5,928,043 A | * | 7/1999 | Rinzaki | 181/229 |
| 5,951,341 A | * | 9/1999 | Rinzaki et al. | 440/77 |
| 6,099,372 A | * | 8/2000 | Toyama | 123/195 C |

FOREIGN PATENT DOCUMENTS

| JP | 194693 | * 11/1983 | 440/77 |
| JP | 120598 | * 7/1984 | 440/77 |
| JP | 04166496 | 12/1992 | |

* cited by examiner

Primary Examiner—Stephen Avila
(74) Attorney, Agent, or Firm—Adams & Wilks

(57) ABSTRACT

Air intake guide is provided within an engine cover and surrounded by a wall that is provided independently of an inner surface of the engine cover. The air intake guide has one end communicating with an air intake opening of the engine cover and the other end opening into an engine room.

19 Claims, 11 Drawing Sheets

OUTBOARD ENGINE UNIT

BACKGROUND OF THE INVENTION

1. Field of the Invention

The present invention relates generally to outboard engine units, and more particularly an improved air intake structure for introducing air into a unit's interior defined by an engine cover.

2. Related Prior Art

Generally, outboard engine units include an engine, an exhaust system and a propellor shaft extending below the engine, and a propellor device (screw) disposed rearward of a gearbox connected to the lower end of the propellor shaft. As viewed from the outside (i.e., in outer appearance), the outboard engine units include an engine cover at the top, an extension case located below the engine cover, and the gearbox and the like at the bottom. To secure a supply of air for combustion of an air/fuel mixture in the engine, there is a need to introduce air into the engine unit's interior defined by the engine cover.

One example of an air intake structure for introducing air into the unit's interior defined by the engine cover is proposed by the assignee of the instant application in Japanese Patent Laid-open Publication No. HEI-4-166496 (U.S. Pat. No. 5,445,547). The proposed air intake structure includes a rib formed on and protruding inwardly from the inner surface of the engine cover made of resin, and a channel-shaped guide member also made of resin and jointed face to face to the rib so that an air intake guide is provided by the inner surface of the engine cover and the guide member.

The proposed air introducing structure, however, would present the following inconvenience. First, it is very difficult to ensure airtightness or sealability between the jointed surfaces of the rib and the guide member. Second, it is very difficult to join the resin-made guide member to the resin-made engine cover with high accuracy. Further, in the air intake structure, the sealing surfaces extend continuously from the inner surface of the top portion of the engine cover to the inner surface of the sides of the engine cover; namely, the sealing surfaces do not lie in one and the same plane, which would also make it difficult to join the guide member to the engine cover with high accuracy.

Furthermore, the engine cover, which constitutes an outer shell member of the outboard engine unit, is subject to deformation due to application thereto of external force and vibration caused by vibration of the engine in operation. Therefore, even severer requirements must be met with regard to the joint between the inner surface of the engine cover and the guide member. Sealing deficiency in the jointed surfaces of the engine cover and the guide member would lead to undesired scattering or spray of water by a negative pressure of intake air.

SUMMARY OF THE INVENTION

It is accordingly an object of the present invention to provide an improved outboard engine unit which includes an air intake guide disposed within an engine cover independently of the engine cover and thereby can secure highly reliable surface sealability even when the engine cover is subjected to external force or vibration caused by the engine in operation.

To accomplish the above-mentioned object, the present invention provides an outboard engine unit which comprises: an engine having a combustion chamber; an engine cover that covers the engine to define an engine room, the engine cover having an air intake opening; and an air intake guide disposed within the engine cover and surrounded by a wall that is provided independently of an inner surface of the engine cover, the air intake guide having one end communicating with the air intake opening of the engine cover and the other end opening into the engine room.

Because the air intake guide for introducing air into the unit's interior defined by the engine cover is provided discretely from or independently of the engine cover, the present invention can eliminate the particular need for securing reliable sealability between the engine cover and the air intake guide. Therefore, it is no longer necessary to care so much about the sealability between the engine cover and the air intake guide, and the present invention can prevent the sealability of the air intake guide from being interfered with by external force applied to the engine cover that constitutes an outer shell member of the outboard engine unit or by vibration of the engine in operation.

BRIEF DESCRIPTION OF THE DRAWINGS

Certain preferred embodiments of the present invention will be described in greater detail with reference to the accompanying sheets of drawings, in which.

DETAILED DESCRIPTION OF THE PREFERRED EMBODIMENTS

Figure 1:
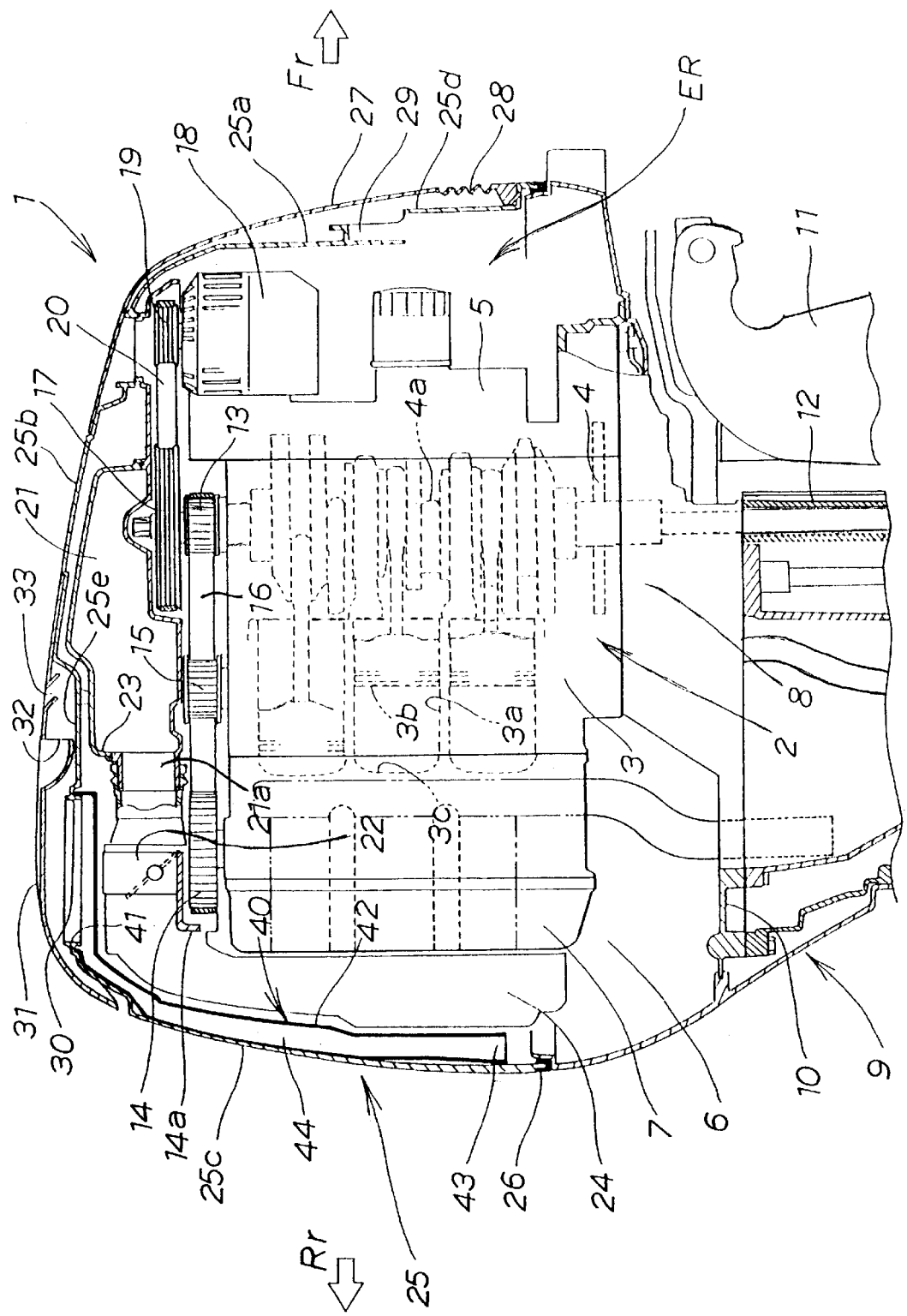
FIG. 1 is a vertical sectional view showing an upper section of an outboard engine unit in accordance with the present invention, which includes an engine cover, an engine housed in the engine cover and an air intake guide.

FIG. 1 is a vertical sectional view showing an upper section of an outboard engine unit in accordance with the present invention, which includes an engine cover, an engine housed in the engine cover and an air intake guide. In FIG. 1, reference numeral 1 denotes the entire outboard engine unit, and reference numeral 2 denotes the engine. The right side portion of the figure represents a front section Fr of the outboard engine unit 1 while the left side portion of the figure represents a rear section Rr of the unit 1.

As illustrated in FIG. 1, the engine 2 in this outboard engine unit 1 is a vertical-type engine where a crankshaft $4a$ having a fly wheel at its lower end is positioned vertically.

The engine 2 includes a plurality of pistons 3b fitted horizontally in respective horizontal cylinders 3a, and a plurality of combustion chambers 3c each formed between one end of the corresponding cylinder and the top of the corresponding piston 3b. Vertical row of such horizontal cylinders 3a constitutes a cylinder block 3. The engine 2 also includes a skirt portion 4 that is integrally formed with the cylinder block 3 housing the vertical crankshaft 4a and located forward of the front (right in FIG. 1) end of the cylinder block 3. The engine 2 further includes a crankcase 5 disposed forward of the front end of the cylinder block 3, a cylinder head 6 and head cover 7 disposed rearward of the rear (left in FIG. 1) end of the cylinder block 3, and an oil pan 8 disposed under the crankcase 5.

Although not specifically shown, the engine 2 in the instant embodiment is a four-stroke six-cylindered V engine which is V-shaped as viewed in plan; namely, the engine 2 includes three upper and three lower cylinders. Lower section of the engine 2 is supported by a mount case 10 provided within an undercover 9 surrounding the engine's lower section. Reference 11 in FIG. 1 denotes a stern bracket securing the outboard engine unit 1 to the stern of a boat to which the present invention is applied.

Further describing the structure of the lower section of the engine 2, the crankshaft 4a extends vertically downwardly into a bottom portion of the oil pan 8 to constitute an output shaft having the lower end connected with the upper end of a driving shaft 12 below the mount case 10, and the driving shaft 12 is coupled via a not-shown gearbox to a propeller shaft.

Immediately above the engine 2 (i.e., above the crankcase 5), there is provided a pulley 13 driven by the crankshaft 4a. Camshaft driving pulley 14 is provided immediately above the cylinder head 6 and head cover 7 on the left side of FIG. 1, and the above-mentioned pulleys 13 and 14 are operatively connected via an endless timing belt 16 wound at its opposite ends around the pulleys 13 and 14 and an intermediate pulley 15. Further, a driving pulley 17 is provided coaxially with and immediately above the pulley 13, and this driving pulley 17 is operatively connected, via a belt 20, with a driven pulley 19 of a power generator (alternator) 18 disposed near the right outer surface of the crankcase 5. The upperside of the camshaft driving pulley 14 is covered with a cam pulley cover 14a.

Intake air silencer 21 is also provided above the crankcase 5 and cylinder block 3 of the engine 2, and this intake air silencer 21 has intake openings at opposite side portions (i.e., opposite portions in the front-and-reverse direction of the sheet of the drawing); namely, FIG. 1 shows the intake air silencer 21 in a vertical section taken centrally in the front-and-reverse direction of the sheet of the drawing). As shown, the intake air silencer 21 has a communication opening 21a at its rear end so as to be in fluid communication, via a connecting tube 23 made of rubber, with a throttle valve device 22 located rearward (i.e., to the left) of the intake air silencer 21. The throttle valve device 22 is coupled with an intake manifold 24, by which combusting air is distributively supplied to the individual cylinders 3a and combustion chambers 3c.

Engine cover 25 in the instant embodiment extends from above the top of the engine to a vertically intermediate portion of the engine 2, so as to continuously cover the top and side surfaces of the engine 2. Engine room ER is defined by the engine cover 25 thus covering the engine 2 and associated peripherals.

The engine cover 25 includes a front cover portion 25a having a front downward extension 25d, a top cover portion 25b having front and rear depressed regions, a rear cover portion 25c, and not-shown side cover portions opposed to each other in the front-and-reverse direction of the sheet of the drawing. The engine cover 25 is open downwardly and has its lower end edge abutted against and jointed to the upper end edge of the above-mentioned undercover 9 via a rubber sealing member 26.

In the engine cover 25, the front downward extension 25d of the front cover portion 25a is covered, along its front surface, with a front cover 27. According to the instant embodiment, the front cover 27 has a plurality of slits 28 formed in a lower end portion thereof. Further, the front cover portion 25a of the engine cover 25 has a labyrinth passage 29.

The depressed portion 25e, which is formed in a rear (left) region of the top cover portion 25b, has an air intake opening 30 formed vertically therethrough and has an upper surface covered with a top cover 31 in such a manner that the depressed portion 25e opens rearwardly toward the rear cover portion 25c. Another air intake opening 32 is formed immediately forward of the front end of the top cover 31, which opens forward. Further, another air intake opening 33 in the form of a horizontally-elongated slit is provided forward of the air intake opening 32.

Figure 2:
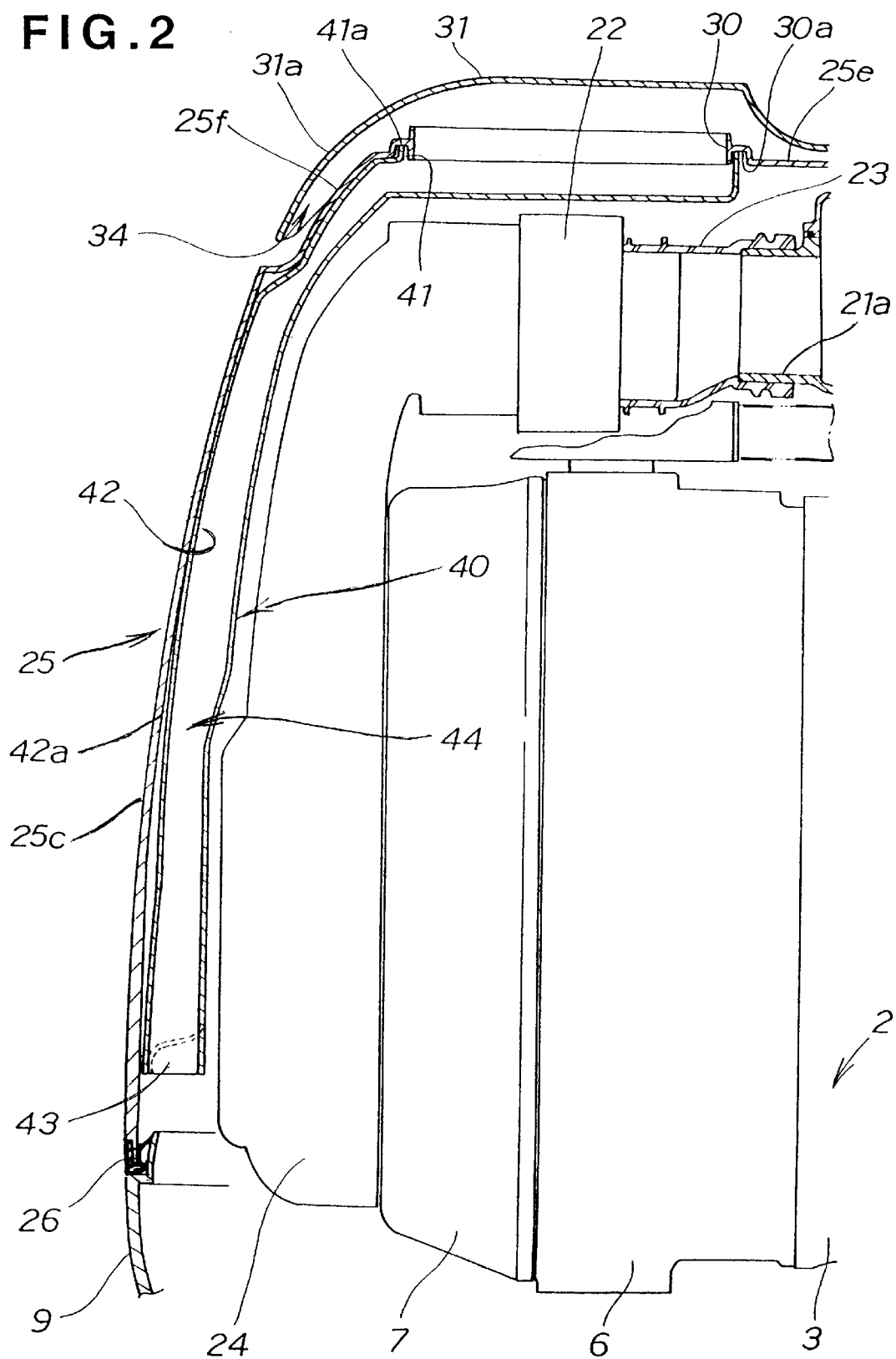
FIG. 2 is a vertical sectional view showing a rear portion of the engine cover of FIG. 1 on an enlarged scale.

FIG. 2 is a vertical sectional view showing the rear portion of the engine cover 25 on an enlarged scale. Rear end region 25f of the depressed portion 25e provided on the rear top of the engine cover 25 is bend rearwardly downwardly, and a rear end region 31a of the top cover 31 is also bend rearwardly downwardly in such a manner to generally form a similar configuration to the eaves or edges of a roof. Air intake slit 34 is formed between the rear end region 31a of the top cover 31 and the rear end region 25f of the depressed portion 25e of the engine cover 25.

The above-mentioned air intake opening 30 is formed in the depressed portion 25e of the engine cover 25 and extends vertically through the wall of the top cover portion 25b. The depressed portion 25e has an engaging groove 30a formed in the underside thereof along its outer periphery. The engaging groove 30a engages with a peripheral edge 41a of a later-described air intake guide 40 defining a top opening 41. The air intake guide 40 in the instant embodiment includes a main body portion 42 extending substantially vertically from the top opening 41 and having a relatively thin configuration in the front-and-rear direction, a slit-shaped bottom opening 43, and a guide passageway 44 connecting between the top and bottom openings 41 and 43.

The above-mentioned air intake guide 40 is a component discrete from and independent of the engine cover 25 and produced independently of the engine cover 25.

In the air intake guide 40, the outer surface of an upper half of the main body portion 42 contacts the inner surface of the rear cover portion 25c of the engine cover 25, but a gap is defined between the outer surface of a lower half of the main body portion 42 and the inner surface of the rear cover portion 25c. The top opening 41 of the air intake guide 40 widely opens upwardly to communicate with the air intake opening 30 in the depressed portion 25e of the engine cover 25 as noted above. The main body portion 42 extends downwardly along the inner surface of the rear cover portion 25c, and the bottom opening 43 opens downward. The top opening 41 and bottom opening 43 are interconnected via the vertical guide passageway 44.

Namely, the air intake guide 40 is disposed vertically along the inner surface of the rear cover portion 25c of the engine cover 25 and located rearward of the cylinder head cover 7 and intake manifold 24.

Figure 3:
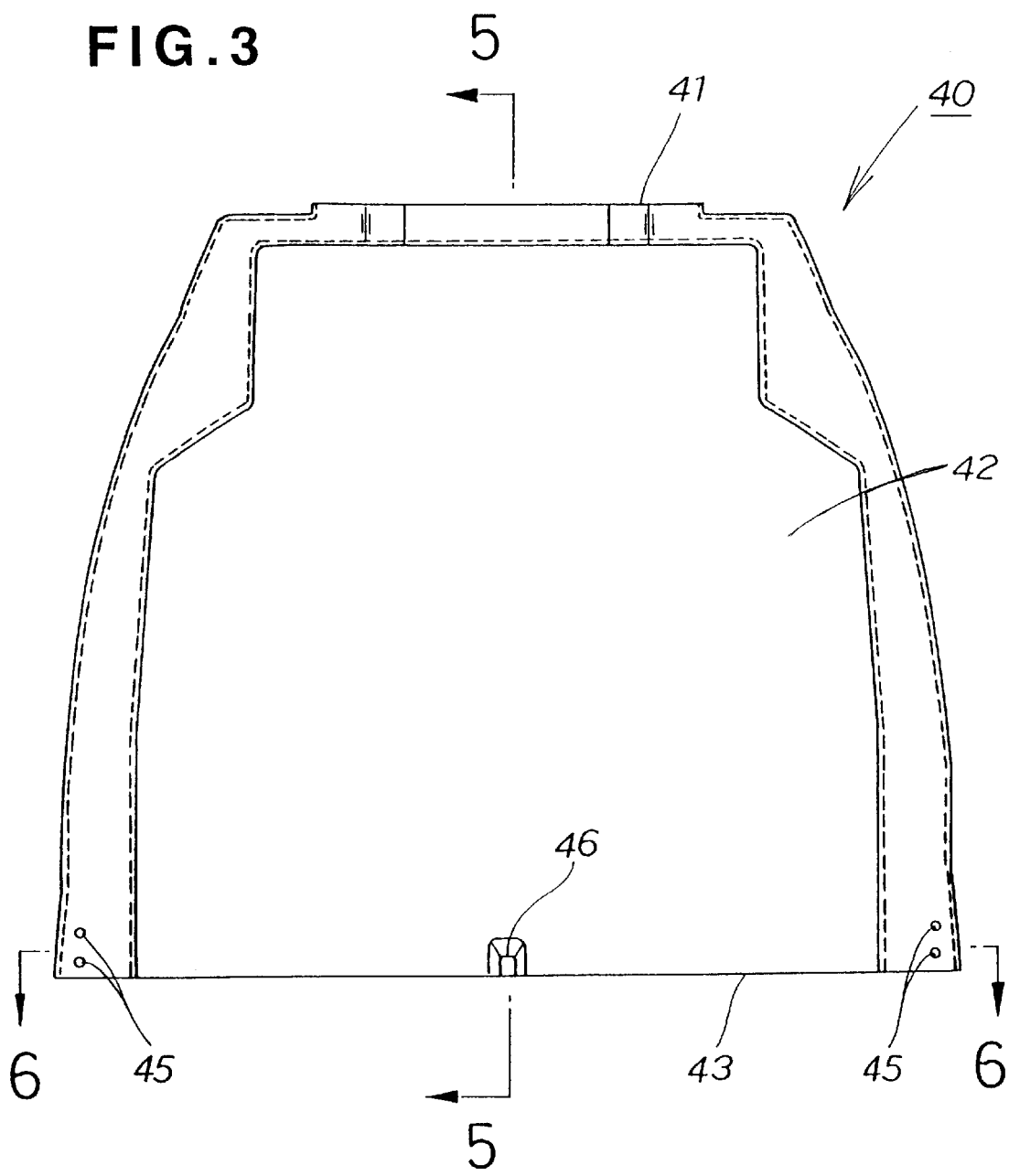
FIG. 3 is an external front view of the air intake guide shown in FIG. 1.
Figure 4:
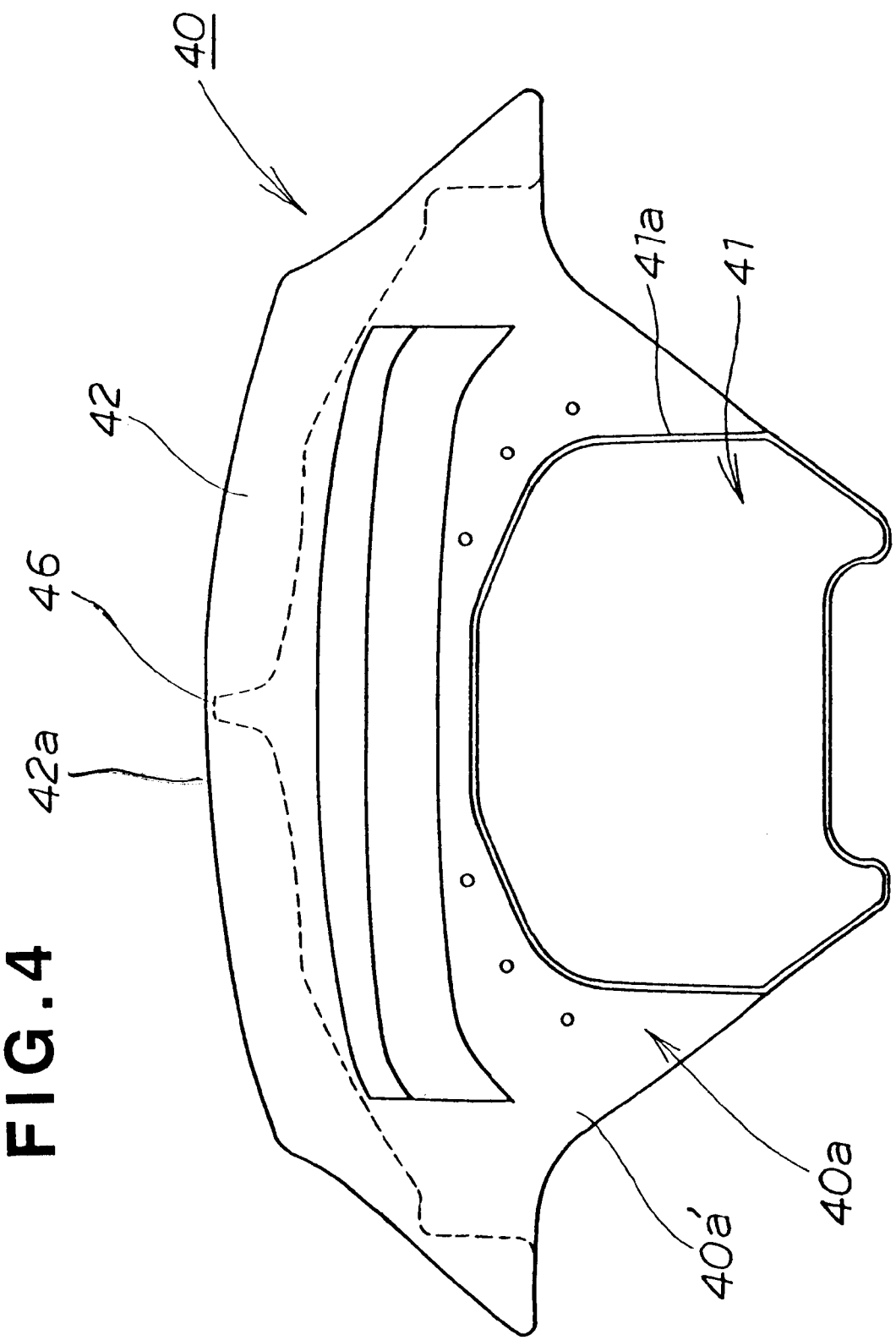
FIG. 4 is a plan view of the air intake guide.
Figure 5:
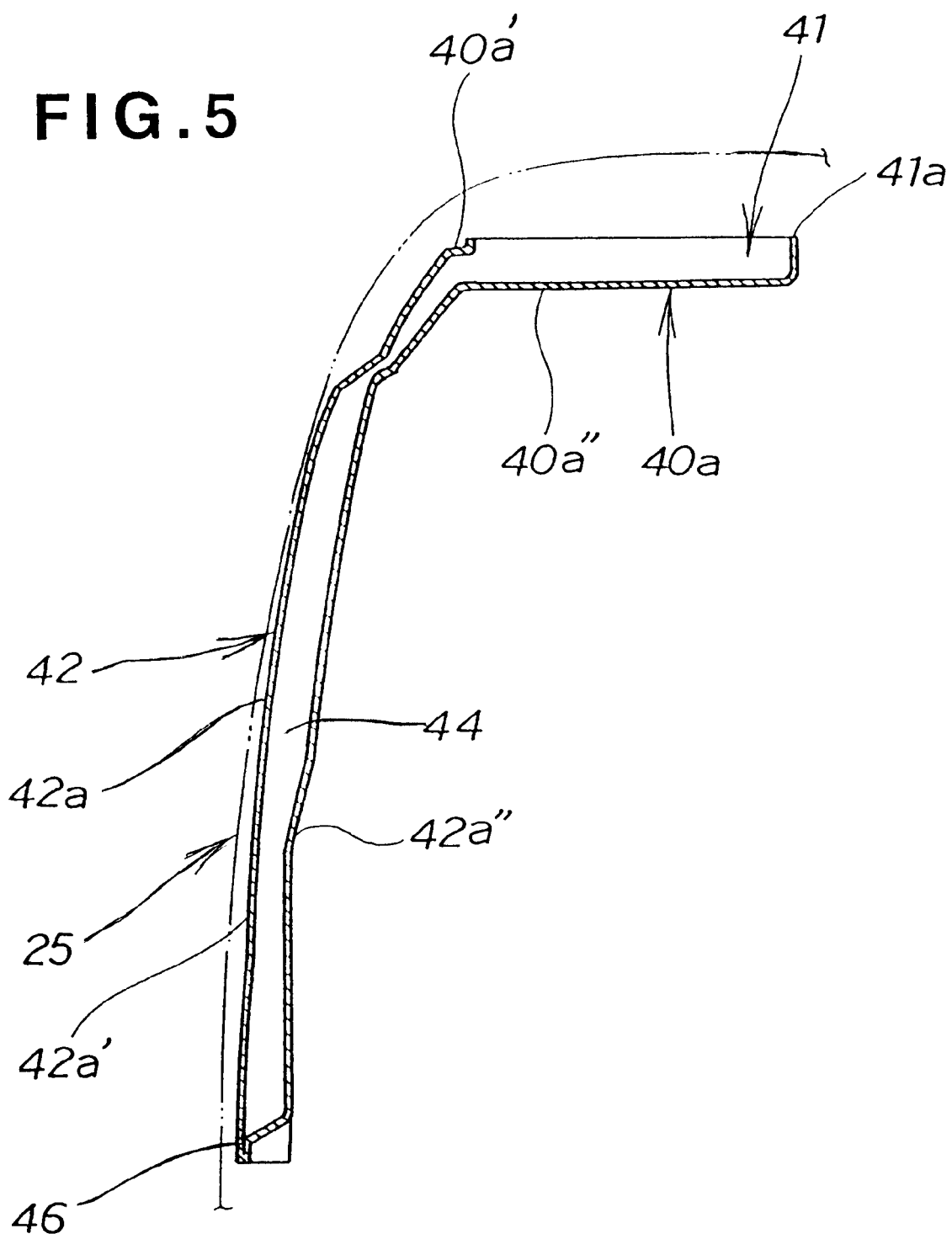
FIG. 5 is a sectional view taken along the 5—5 line of FIG. 3.
Figure 6:
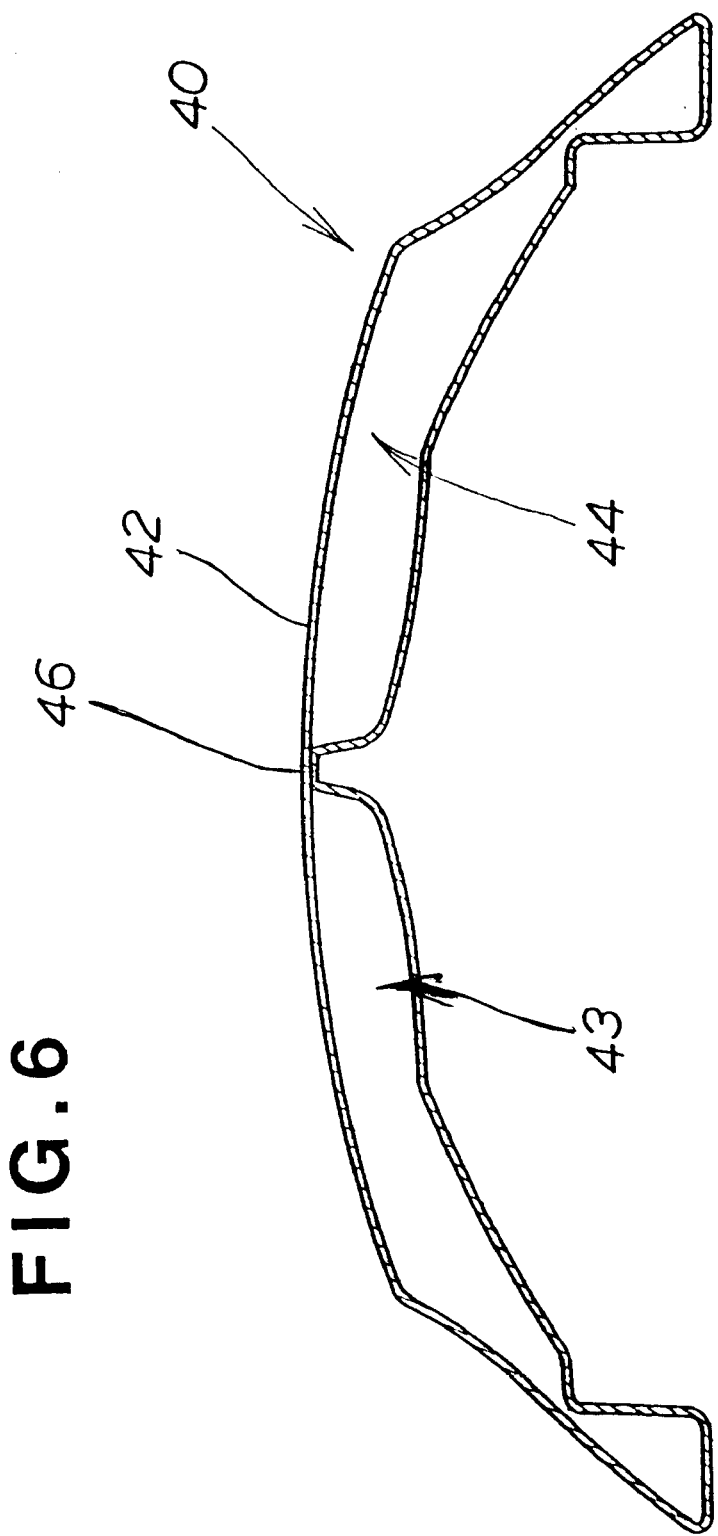
FIG. 6 is a sectional view taken along the 6—6 line of FIG. 3.

FIGS. 3 to 6 show details of the air intake guide 40; more specifically, FIG. 3 is an external front view of the air intake guide 40, FIG. 4 is a plan view of the intake guide 40, FIG. 5 is a sectional view taken along the 5—5 line of FIG. 3, and FIG. 6 is a sectional view taken along the 6—6 line of FIG. 3.

As seen in FIG. 3, the air intake guide 40 in the instant embodiment has a width slightly greater than its height. The main body portion 42 of the intake guide 40 has, in its left and right lower end regions, a plurality of fastening holes 45 for fastening the air intake guide 40 to the engine cover 25. The main body portion 42 also has a reinforcing rib 46 formed centrally on its lower end.

As clearly seen from FIG. 4, the air intake guide 40 has a greater dimension in its horizontally-central portion as viewed in plan. Also, as shown in FIG. 5, the air intake guide 40 has an upper portion 40a extending in the front-and-rear direction to generally form the shape of eaves, so that the air intake guide 40 has substantially an overall shape of an inverted "L" as viewed sideways (also see FIGS. 1 and 2).

The eaves-shaped upper portion 40a of the air intake guide 40 includes an upper wall portion 40a' having the top opening 41 that opens upward, and a lower wall portion 40a". As also shown in FIG. 5, the vertical guide passageway 44 is defined by outer and inner wall portions 42a' and 42" of the main body portion 42, and the main body portion 42 extends downwardly from the rear end of the eaves-shaped upper portion 40a. In FIG. 5, the bottom opening 43 of the guide passageway 44 is virtually bridged, at its middle portion in the left-and-right direction, by the reinforcing rib 46. For better understanding of the bottom opening 43, FIGS. 1 and 2 both show the bottom opening 43 in section taken through a portion thereof more or less offset from the 5—5 line of FIG. 3.

As shown in FIG. 6, the guide passageway 44 is divided, near the lower end of the air intake guide 40, into left and right passages by the central reinforcing rib 46 that is preferably formed integrally with the rear and wall portions during blowing formation of the guide 40 after the rib 46 is first abutted against the wall portions. The portions of the reinforcing rib 46 abutted against the rear and front wall portions function to prevents the front and rear wall portions from vibrating due to variations in the negative pressure of the intake air.

The air intake guide 40 is integrally formed of synthetic resin into one piece; more specifically, the intake guide 40 is formed, by blowing, of polypropylene (PP) which has superior resistance to heat and corrosion.

Figure 7:
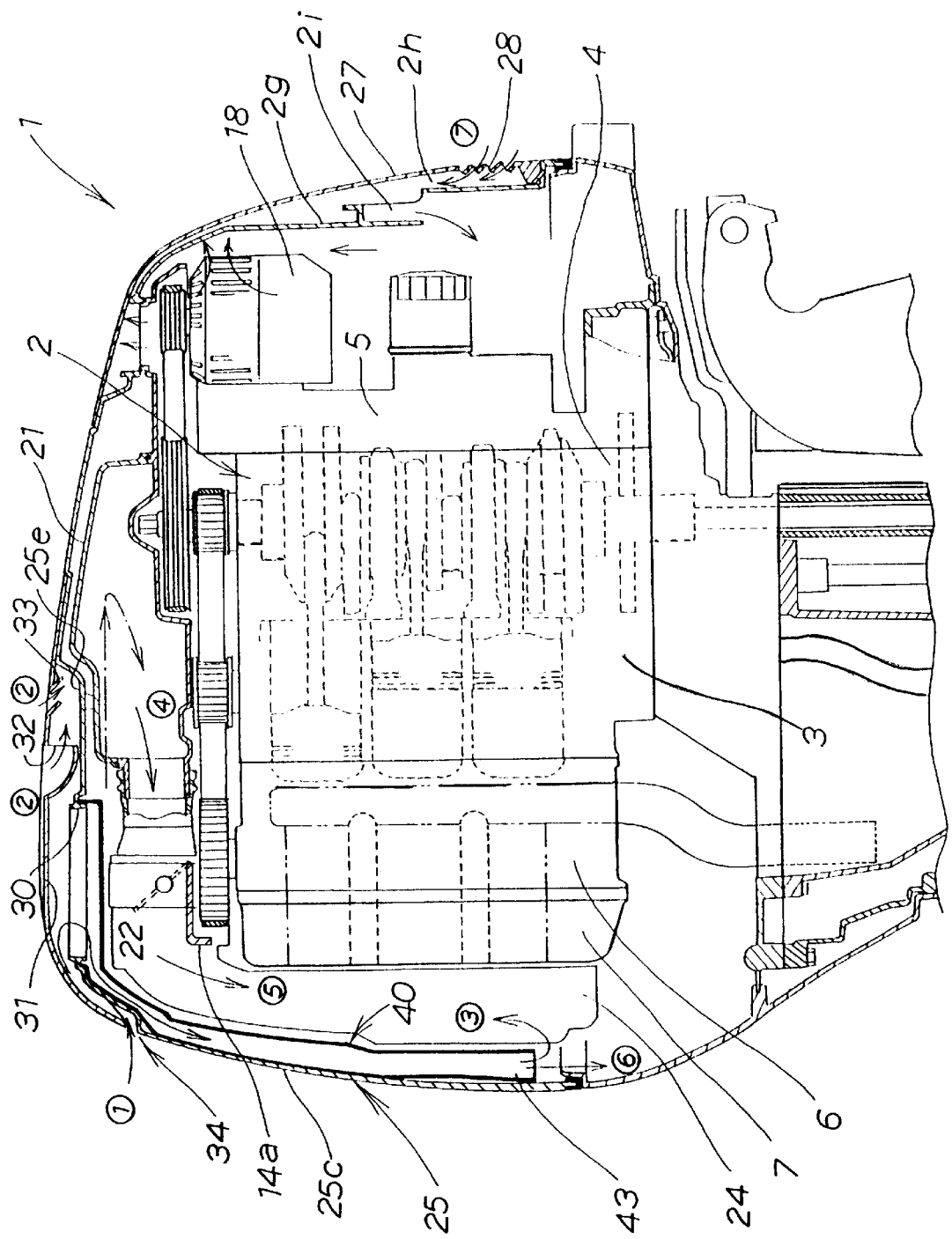
FIG. 7 is a view similar to FIG. 1, which is explanatory of a manner in which air is introduced into the outboard engine unit.

FIG. 7 is a view explanatory of a manner in which air is introduced into the outboard engine unit 1 and engine cover 2. As denoted by arrows ① and ②, air is introduced into the depressed portion 25e of the engine cover 25 through the intake slit 34 formed between the top cover 31 and the upper end of the rear cover portion 25c of the engine cover 25 and through the air intake openings 32 and 33. A proportion of the thus-introduced air is directed into the air intake guide 40 via the intake opening 30 and top opening 41, and then fed through the guide passageway 44 into the engine cover 25 via the bottom opening 43 as denoted by arrow ③.

Another proportion of the introduced air is fed into the intake air silencer 21 through not-shown left and right openings thereof as depicted by arrow ④, from which it passes through the throttle valve device 22 and then is supplied into the engine as an air/fuel mixture as depicted by arrow ⑤.

Generally, in the conventional outboard engine units, there is a possibility of sprays of water, such as seawater, undesirably entering the air intake guide 40 along with fresh air. However, with the air intake guide 40 employed in the present invention, which is an elongated member disposed in the vertical direction of the engine unit, the fresh air with water contained therein that is discharged downwardly out of the intake guide 40 can be reliably prevented from being directed into the induction system or combustion chambers.

Further, because the air intake guide 40 is provided completely discretely from and independently of the engine cover, it is not necessary to care so much about the surface 10 sealability between the engine cover 25 and the air intake guide 40 as in the conventional outboard engine units even when the engine cover vibrates due to vibration of the engine in operation, and the possibility of water entering the induction system due to sealing deficiency can be reliably avoided.

Furthermore, the sealing surfaces between the engine cover 25 and the air intake guide 40 in the present invention lies in substantially the same plane as the inner surface of the top cover portion 25b, so that reliable sealability is achievable with great facility.

Further, in FIG. 7, fresh air is introduced into the engine cover 25 through the slits 28 of the front cover 27 as depicted by arrow ⑦. Then, the introduced fresh air is supplied from a communication passage 2i, formed between spaced-apart rear and front wall portions 2g and 2h, to a region under the Power generator 18 that is also a source of heat, so as to cool the Power generator 18. Also, the introduced air is directed upward through a gap between the front cover 27 and the engine cover 25. The air is also directed through upper apertures of the power generator 18. When the power generator 18 is in an OFF state, residual heat is let out upwardly from the generator 18 through its openings.

Figure 8:
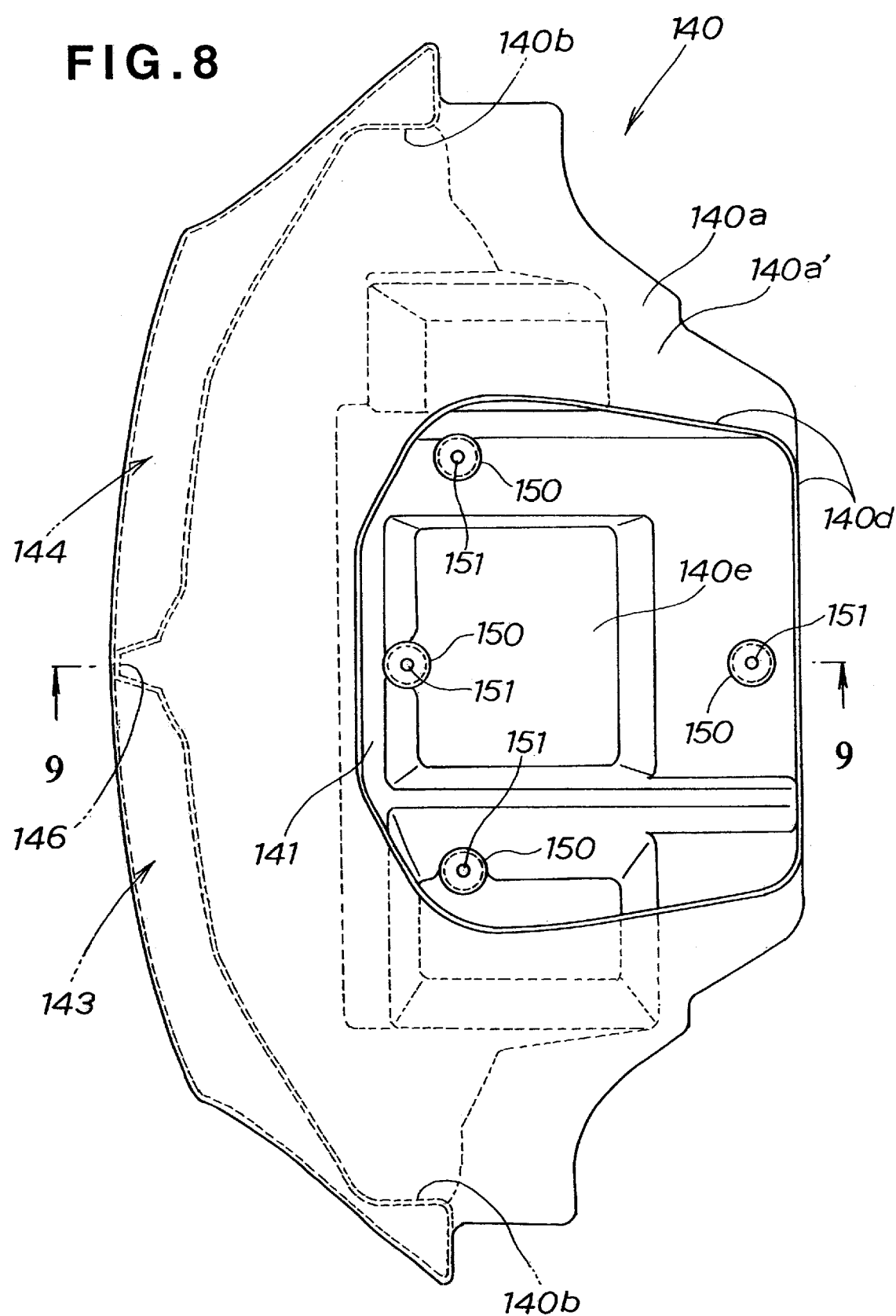
FIG. 8 is a plan view of a modified air intake guide.
Figure 9:
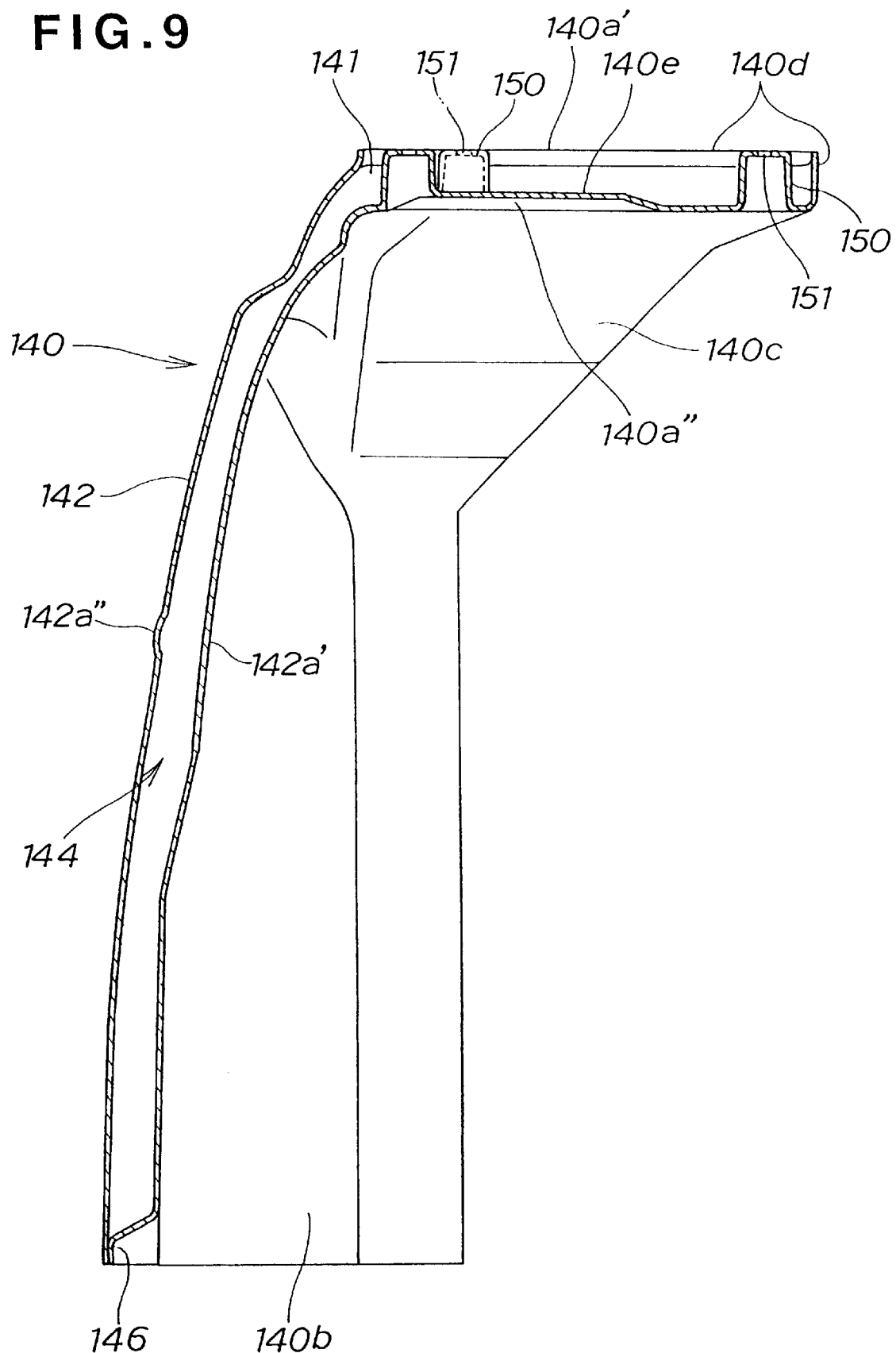
FIG. 9 is a sectional view of the modified air intake guide taken along the 9—9 line of FIG. 8.

FIGS. 8 to 11 show another embodiment of the present invention. More specifically, FIG. 8 is a plan view of a modified air intake guide 140, and FIG. 9 is a sectional view of the air intake guide 140 taken along line 9—9 of FIG. 8.

The modified air intake guide 140 is located in a rearward interior region within the engine cover 25, and extends vertically within the rearward interior region. The air intake guide 140 includes a shelf portion 140a extending horizontally forward from the top of a main body portion 142 having inner and outer wall portions 142a' and 142a". The shelf portion 140a has an upper wall portion 140a' and a lower or bottom wall portion 140a". Opposed sides of the shelf portion 140a are connected to upper regions of opposed sides 140b of the main body portion 142 by means of left and right pieces 140c of the main body portion 142 which extend obliquely downward in the front-to-rear direction of the unit. The shelf portion 140a, sides 140b and pieces 140c extend continuously with no break. The main body portion 142 defines a vertical guide passageway or duct 144, a bottom opening 143 that opens downward is bridged, at its middle portion in the left-and-right direction, by a reinforcing rib 146.

The shelf portion 140a of the air intake guide 140 includes a frame portion 140d having a generally rectangular shape as viewed in plan. The frame portion 140d is located centrally in the left-and-right direction of the shelf portion 140a and closer to the front end of the shelf portion 140a. The bottom piece 140a" of the shelf portion 140a has an upward bulge 140e in a region surrounded by the rectangular frame portion 140d. A plurality of bosses, each having a circular shape in cross section and an inverted cup-like shape in vertical section, are formed integrally on the bottom piece 140a" of the shelf portion 140a; in the illustrated example, there are provided four such bosses: one located immediately outward of the middle of the rear end edge of the upward bulge 140e (rear boss); two located outward of the opposite side edges of the upward bulge 140e (side bosses); and the remaining one located outward of the front end edge of the upward bulge 140e (front boss). Each of these bosses 150 has a mounting hole 151 at its top.

Air intake opening or slit 141 is provided outside the frame portion 140d at a position rearward of the rear boss 150. This air intake opening 141 is in communication with the duct 144 of the main body portion 142, and functions to supply fresh air to the duct 144 so that the air is introduced into the engine room through the bottom opening 143.

Figure 10:
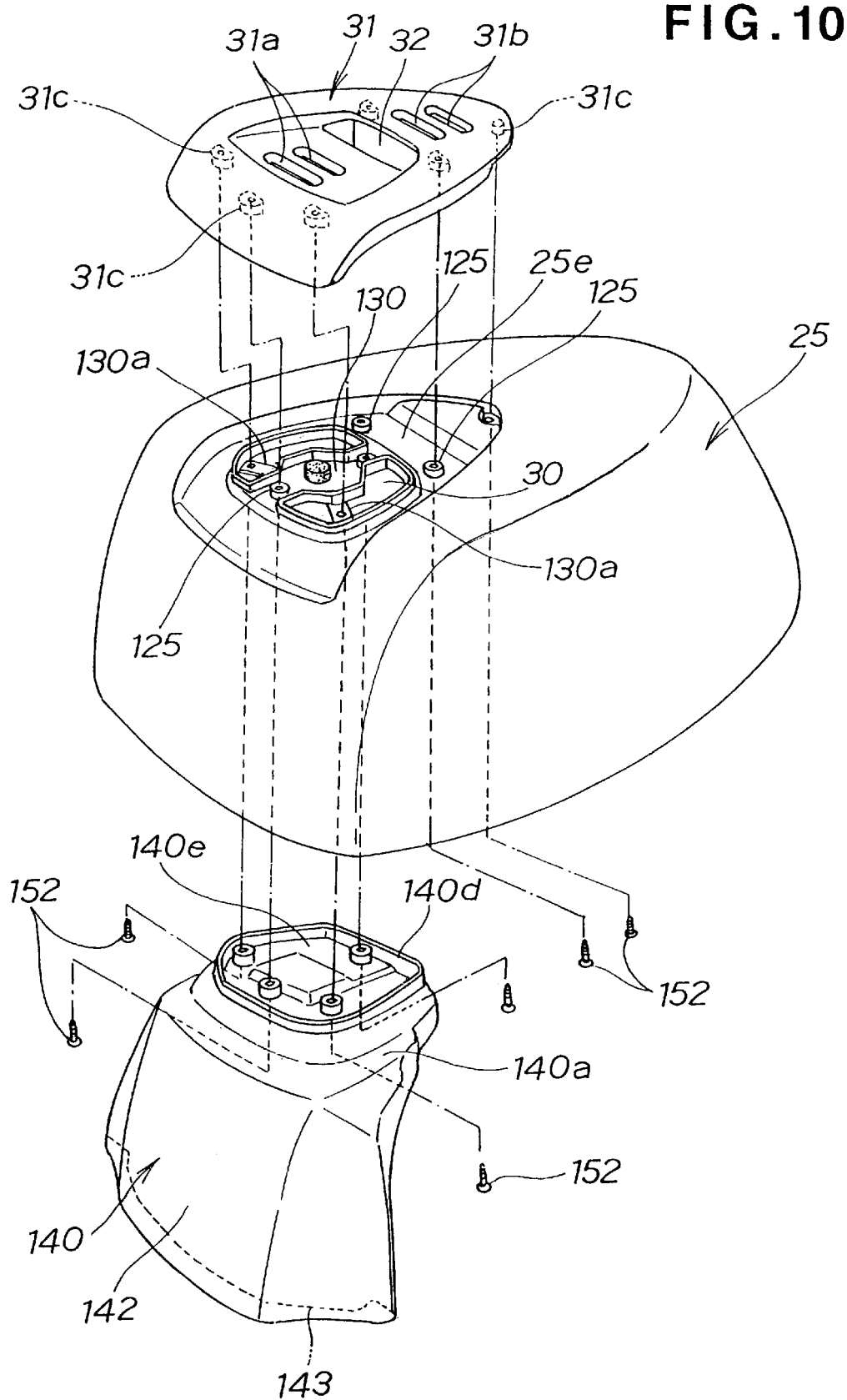
FIG. 10 is an exploded perspective view of the engine cover, top cover and air intake opening.

FIG. 10 is an exploded perspective view of the engine cover 25, top cover 31 and air intake opening 141.

As shown, the depressed portion 25e is formed in a rear region of the top of the engine cover 25, and the opening 30 is provided rearward of the depressed portion 25e and surrounded by an upright frame portion. Bridge piece 130 extending in the front-and-rear direction is disposed in a position of the opening 30 virtually centrally in the left-and-right direction. The bridge piece 130 has a plurality of stays 130a formed integrally therewith, and a plurality of mounting bosses 125, each having a mounting hole, are provided on the upper surface of the bridge piece 130 and depressed portion 25e. The top cover 31 also has a plurality of mounting bosses 31c, each having a mounting hole, formed on the lower surface of rear and front portions thereof. Reference numerals 31a and 31b represent a plurality of air intake slits, and reference numeral 152 represents a plurality of fastening screws.

Figure 11:
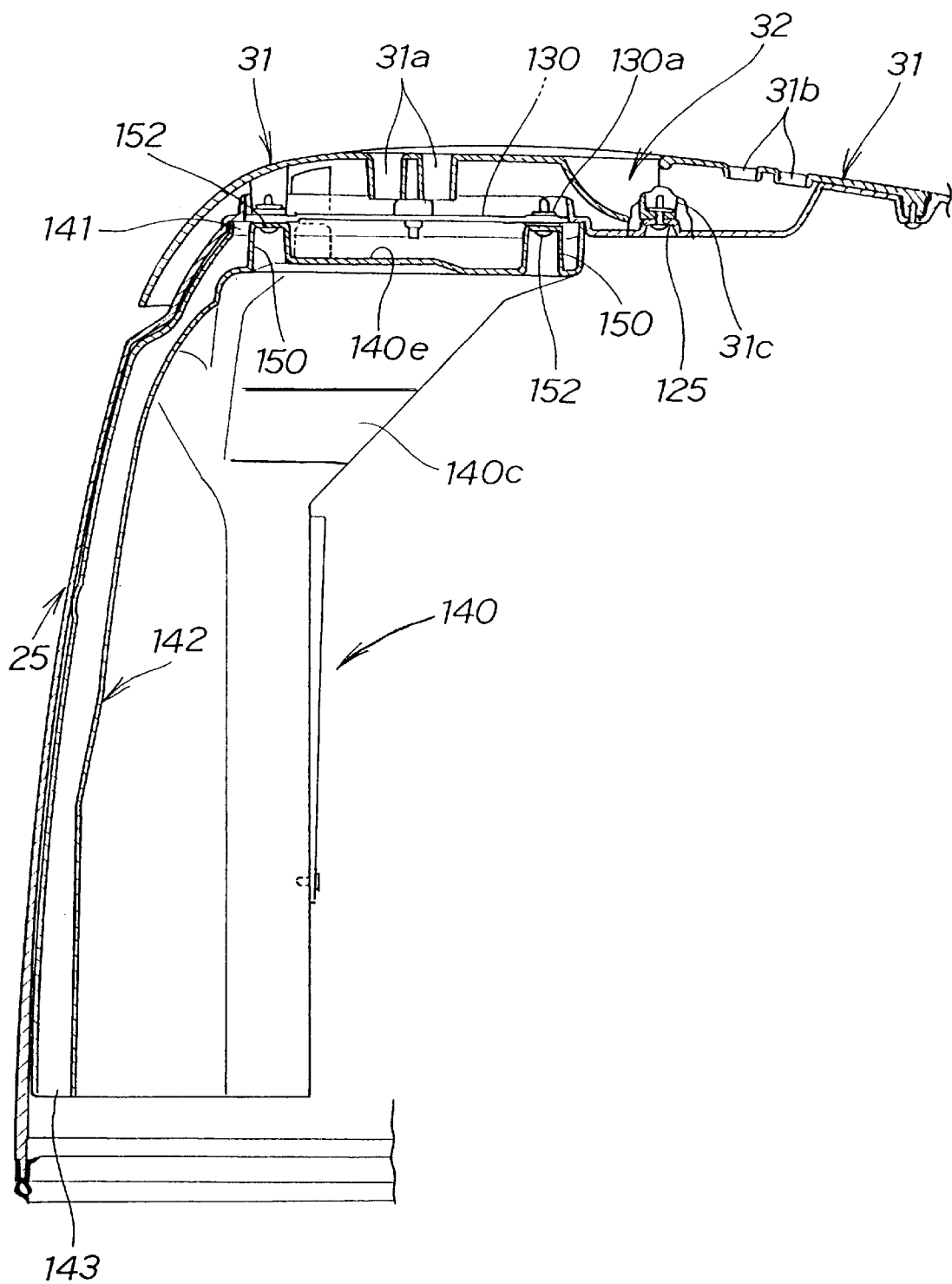
FIG. 11 is a vertical sectional view showing the engine cover, top cover and air intake opening in an assembled state.

FIG. 11 is a vertical sectional view showing the engine cover 25, top cover 31 and air intake guide 140 in an assembled state.

In assembly, the upper surface of the shelf portion 140a of the air intake guide 140 is first brought into contact with the lower surface of the depressed portion 25e of the engine cover 25. Then, the screws 152 are inserted, from below or above, into the bosses 150 of the inverted cup-like shape provided on the upward bulge 140e surrounded by the frame portion 140d, stays 130a provided on the bridge piece 130 and the like in the opening 30 of the engine cover 25, and mounting bosses 125. Then, the air intake guide 140 and top cover 31 are fastened together to the engine cover 25 by means of the screws 152.

Because the bosses 150 are located within the opening area defined by the frame portion 140d as noted above, this embodiment allows the air intake guide 140 to be secured to the engine cover 25 without the fastening screws 152 passing through the shelf portion 140a, and thus can eliminate a need for a particular sealing structure.

It should be appreciated that the construction of the air intake guide 140 and the manner of securing the intake guide 140 to the engine cover 25 are not limited to those described above and may be modified variously without departing from the basic principles of the present invention. Note that the air intake guide 140 may be integrally formed of synthetic resin into one piece; namely, similarly to the air intake guide 40 described above in relation to the first embodiment, the modified air intake guide 140 may be formed, by blowing, of polypropylene (PP) which has superior resistance to heat and corrosion.

In summary, the outboard engine unit of the present invention is characterized in that the air intake guide is disposed within the engine cover and surrounded by a wall that is provided independently of the inner surface of the engine cover, and that the air intake guide has one end communicating with the air intake opening of the engine cover and the other end opening into the engine room.

Because the air intake guide for introducing fresh air into the interior defined by the engine cover is provided discretely from and independently of the engine cover, the present invention can avoid the need for securing reliable sealability between the engine cover and the air intake guide. Therefore, even when the engine cover, which constitutes an outer shell member of the outboard engine unit, is subjected to external force or vibration of the engine cover caused by the engine in operation, it is no longer necessary to care so much about the sealability between the engine cover and the air intake guide as in the conventional outboard engine units; namely, the present invention can reliably prevent water from entering the air intake guide and induction system due to sealing deficiency. Further, because the sealing surfaces lie in generally the same plane, the sealing operations can be performed with ease.

Further, the above benefits can be attained readily by just providing the air intake guide discretely from and independently of the engine cover, without requiring complicated construction.

Obviously, various minor changes and modifications of the present invention are possible in the light of the above teaching. It is therefore to be understood that within the scope of the appended claims the invention may be practiced otherwise than as specifically described.

What is claimed is:

1. An outboard engine unit comprising: an engine having a combustion chamber; an engine cover that covers said engine to define an engine room, said engine cover having an air intake opening; and an air intake guide disposed within said engine cover and having an air passageway surrounded by a wall that is separate from an inner surface of said engine cover, said air intake guide having one end communicating with the air intake opening of said engine cover such that a seal is formed with respect to the engine cover and another end opening into the engine room.

2. An outboard engine unit according to claim 1; wherein said air intake guide is blow molded.

3. An outboard engine unit according to claim 1; wherein the air intake guide has a top opening connected to the air intake opening in the engine cover, the top opening being larger in diameter than the air intake opening.

4. An outboard engine unit according to claim 3; wherein the air intake opening and the top opening lie in substantially the same plane.

5. An outboard engine unit according to claim 1; wherein the wall of the air passageway has an inner wall portion, an outer wall portion connected to the inner wall portion, and a reinforcing rib for reinforcing the connection between the inner and outer wall portions.

6. An outboard engine unit according to claim 1; wherein the air intake guide has a top opening connected to the air intake opening in the engine cover, the top opening having a plurality of bosses surrounded by a frame for connecting the air intake guide to the air intake opening.

7. An outboard engine unit according to claim 1; wherein the air intake opening is provided in an upper portion of the engine cover, and the air intake guide has a first opening connected to the air intake opening, a second opening in the engine room for discharging air, and a main body defining the wall connecting the first and second openings and extending downward from the air intake opening into the engine room.

8. An outboard engine unit according to claim 7; wherein the main body has an upper portion in contact with an inner surface of the engine cover and a lower portion spaced from the inner surface of the engine cover.

9. An outboard engine unit according to claim 7; wherein the engine cover has a depressed portion in which the air intake opening is formed; and further comprising a top cover member covering the depressed portion and having one or more openings in communication with the air intake opening.

10. An outboard engine unit according to claim 9; wherein the depressed portion has an engaging groove formed therein along a periphery of the air intake opening; and the air intake guide has a peripheral edge larger than the air intake opening engaged with the engaging groove formed in the depressed portion so as to form a seal with respect to the engine cover.

11. An outboard engine unit according to claim 9; wherein another air intake opening is defined by a space between the top cover member and the engine cover.

12. An outboard engine unit according to claim 1; wherein the engine cover has a top cover portion, a front cover portion, a rear cover portion, and side cover portions, the air intake opening is provided proximate a rear end of the top cover portion, and the air intake guide extends downward from the air intake opening between the engine and an inside surface of the rear cover portion.

13. An outboard engine unit according to claim 12; wherein an outer surface of an upper half of the wall of the air intake guide contacts the inner surface of the rear cover portion of the engine cover, and a gap is defined between the outer surface of a lower half of the wall of the air intake guide and the rear cover portion of the engine cover.

14. An outboard engine unit according to claim 1; wherein the air intake guide has a vertically elongated main body portion extending from the one end to the other end, and a horizontally oriented upper portion in which the one end is formed, the upper portion being in substantially the same plane as the air intake opening.

15. An outboard engine unit comprising: an engine having a combustion chamber; an engine cover defining an engine compartment in which the engine is disposed and having an air intake opening for taking in outside air from outside the engine unit; and an air intake guide for receiving the outside air and directing the outside air to the engine room, the air intake guide having a main body defining a guide passageway for guiding the outside air that is disposed within the engine cover, the main body being separate from the engine cover and having a first end directly connected to the air intake opening of the engine cover and a second end opening into the engine compartment.

16. An outboard engine unit according to claim 15; wherein the first end of the air intake guide has a top opening larger in diameter than the air intake opening.

17. An outboard engine unit according to claim 16; wherein the air intake opening and the top opening lie in substantially the same plane.

18. An outboard engine unit according to claim 15; wherein the main body of the air intake guide has an inner wall portion, and outer wall portion connected to the inner wall portion, and a reinforcing rib for reinforcing the connection between the inner and outer wall portions.

19. An outboard engine unit according to claim 15; wherein the first end of the air intake guide has a top opening directly connected to the air intake opening in the engine cover, the top opening having a plurality of bosses surrounded by a frame for connecting the air intake guide to the air intake opening.

\* \* \* \* \*